Oct. 18, 1938.    A. F. DITTMER    2,133,498
CONTACT LENS
Filed Aug. 21, 1937

ARTHUR F. DITTMER
INVENTOR
BY
ATTORNEYS

Patented Oct. 18, 1938

2,133,498

UNITED STATES PATENT OFFICE 2,133,498

CONTACT LENS

Arthur F. Dittmer, Rochester, N. Y., assignor to Bausch & Lomb Optical Company, Rochester, N. Y., a corporation of New York Application August 21, 1937, Serial No. 160,205

5 Claims. (Cl. 88—54)

The present invention relates to contact lenses and more particularly to means for marking same.

At the present time, contact lenses may be fitted from a trial set in which each contact lens has a glass corneal portion and a rigid scleral rim. The scleral rims are made on predetermined toric and spherical curves and, for convenience, it is essential that the both radii and one axis of the scleral rim be permanently marked on the contact glass.

One of the objects of the present invention is to provide a contact lens with a mark which is visible when off the eye and invisible when on the eye. Another object is to provide a contact lens with such a mark to designate one axis of the scleral rim. Another object is to provide a contact lens with such a mark to designate the radii of the scleral rim. These and other objects and advantages reside in certain novel features of construction, arrangement and combination of parts as will hereinafter be more fully set forth and pointed out in the appended claims.

Referring to the drawing.

The contact lens of the present invention consists of a transparent corneal part 20 and a scleral rim 21. The corneal portion 20 is preferably formed of glass while the scleral rim preferably consists of a hard, rigid, moldable material impervious to the fluids of the eye. One suitable substance is the synthetic resin commercially known under the trade name of "Luxene". Of course, other materials such as glass or other synthetic resins could be used, but since the composition of the rim forms no part of the present invention, no further description is necessary.

One application of the present invention is found when contact lenses are fitted from a set of trial lenses. The scleral rims of the lenses of such a set would be made on toric forms and have one radius $R_1$ in one meridian and another radius $R_2$ in the meridian at right angles to $R_1$. Of course, when the radii are equal, the rim would be spherical.

In such a set, it is necessary that the radii and the position of one meridian or axis be clearly marked on the contact lens itself. This marking cannot be conveniently placed on the scleral rim 21 and, if placed on the corneal section 20, it must be invisible when the contact lens is on the eye.

Figure 1:
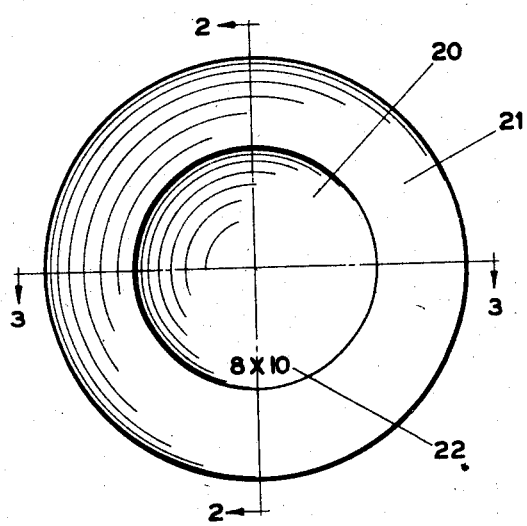
Fig. 1 is a rear view of a contact lens embodying the present invention.
Figure 2:
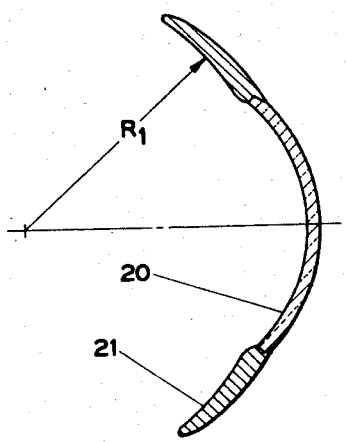
Fig. 2 is a section taken on line 2—2 of Fig. 1.
Figure 3:
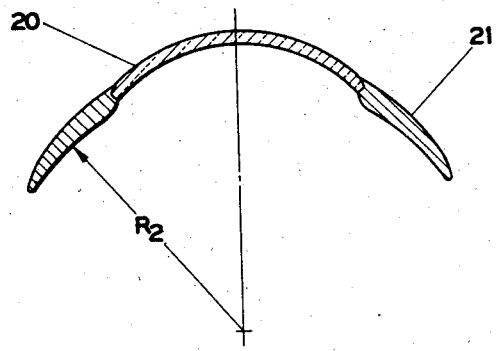
Fig. 3 is a section taken on line 3—3 of Fig. 1.

According to the present invention, a suitable legend 22 such as the figures 8 x 10 in Fig. 1 is etched, engraved or the like on the inner surface of the corneal portion 20. Such a marking is visible when the contact lens is dry but when the contact lens is on the eye, the fluid between the lens and eye extends into the etched or engraved marks and renders them invisible against the iris.

The figures 8 and 10 of the legend 22 may be arbitrary figures denoting, respectively, the two curves $R_1$ and $R_2$ and the legend 22 is placed so that one meridian or axis, in the drawing the meridian or axis of the curve $R_1$, passes through the $x$. Thus when a properly fitting toric lens is found, the patient can always replace it by merely making sure that the $x$ of the legend 22 is in its proper position.

From the foregoing, it will be apparent that I am able to attain the objects of my invention and provide a contact lens with a permanent mark which is visible when the lens is dry and invisible when the lens is in position on the eye. The term "etch" as used throughout the specification and claims includes any marking where the surface is merely roughened or cut so that it can be filled with fluid, and includes engraving, scribing, scratching or similar marking. Various modifications can, of course, be made without departing from the spirit of my invention or the scope of the appended claims.

I claim:

1. A contact lens comprising a transparent corneal portion and a toric scleral rim, said transparent corneal portion having an index mark etched on its inner surface to designate one axis of the toric scleral rim.

2. A contact lens comprising a transparent corneal portion and a toric scleral rim, said transparent corneal portion having the radii of the toric scleral rim etched on its inner surface.

3. A contact lens comprising a transparent corneal portion and a toric scleral rim, said transparent corneal portion having the radii of the toric rim and the position of one axis of said rim etched on its inner surface.

4. A contact lens comprising a transparent glass corneal lens section, and a toric scleral rim of moldable material secured thereto, said glass corneal lens section being etched on its inner surface to designate one axis of the toric scleral rim.

5. A contact lens comprising a transparent glass corneal lens section, and a toric scleral rim of moldable material secured thereto, said glass corneal lens section being etched on its inner surface to designate the radii of the toric scleral rim.

ARTHUR F. DITTMER.